David W. Rabenhorst
INVENTOR

Sept. 23, 1969  D. W. RABENHORST  3,467,992
RELEASABLE FASTENER

Original Filed Aug. 4, 1967  2 Sheets-Sheet 2

David W. Rabenhorst

United States Patent Office 3,467,992
Patented Sept. 23, 1969

3,467,992
RELEASABLE FASTENER
David W. Rabenhorst, Silver Spring, Md., assignor, by mesne assignments, to the United States of America as represented by the Secretary of the Navy
Original application Aug. 4, 1967, Ser. No. 658,988. Divided and this application Aug. 7, 1968, Ser. No. 750,838
Int. Cl. B65d 67/02
U.S. Cl. 24—19                5 Claims

ABSTRACT OF THE DISCLOSURE

The present invention is a self-releasing mechanical bolt fastener which initially clamps aligned bolts under considerable tension and which, upon the application of a nominal operating force, will release the bolts without prior art explosive techniques. The invention finds particular use as a connector between a satellite and a launching vehicle. The unique self-releasing clamp of the present invention may find wide use in a variety of aerospace applications. Additionally, the device, being completely mechanical in operation, may be repeatedly tested without destruction of its parts as a result of such testing.

BACKGROUND OF THE INVENTION

Field of the invention

This application is a division of patent application Ser. No. 658,988, filed Aug. 4, 1967, which is the sole application of David W. Rabenhorst. The present invention relates to a self-releasing clamp actuated and operated by non-explosive means. The clamp of the present invention provides the capability of retaining aligned bolts under considerable tension and releasing said bolts upon the application of an external force.

DESCRIPTION OF THE PRIOR ART

From the beginning of the space age to the present time, most inflight functions, such as payload separation, have been initiated by explosive devices. These explosive systems comprise power supplies, squib igniters, bolt cutters, and explosive bolts or nuts. They can be checked electrically to a certain extent, but proper squib operation is always unpredictable. Squib reliability is proven by testing a certain percentage of a given lot. When the system is designed, squib redundency is required for reliability. Special care must be taken to safeguard against premature squib ignition by R.F. energy or static electricity. In some cases premature squib ignition presents a severe personnel injury hazard. Additionally, most squibs require electrical energy in the form of batteries for activation, adding to the weight and complexity of these systems.

SUMMARY

The present invention was developed to provide means for releasably connecting a pair of semi-circular rings, comprising a Marmon collar, attached in belt-like fashion about a satellite and the upper terminal portion of a launching vehicle by bolts under considerable tension. In prior art releasing systems the bolts of the Marmon collar are severed at the proper time by explosive bolt cutters which allow separation of the Marmon collar rings. The present device accomplishes release of the bolts without the use of explosives or cutting instruments by providing a completely passive release mechanism which can be entirely checked out on the ground and completely proven by repeated operation before flight.

The mechanism of the present invention is a small clamp type device, whose interface angles are so chosen as to translate a low operating force to a large retaining force. The device exhibits the capability of retaining a force of 1,000 pounds in tension, while requiring only a 15 pound operating force to provide the large retaining force. The operating force is built into the mechanism, and only a means to allow the force to act is necessary for operation. The ratio of forces may be held constant for any set of loading conditions, with only the physical size of the members varying accordingly.

It is therefore an object of the invention to provide means operable in a payload separation system for separating a payload from a launching vehicle.

A further object of the invention is to provide a reliable passive release mechanism capable of preflight check-out without personnel injury hazard.

Another object of the invention is to provide a clamp type device capable of translating a low operating force to a large retaining force.

Other objects and attendant advantages of the present invention will be readily appreciated as the same becomes better understood by reference to the following detailed description when considered in conjunction with the accompanying drawings.

DESCRIPTION OF THE PREFERRED EMBODIMENTS

Figure 1:
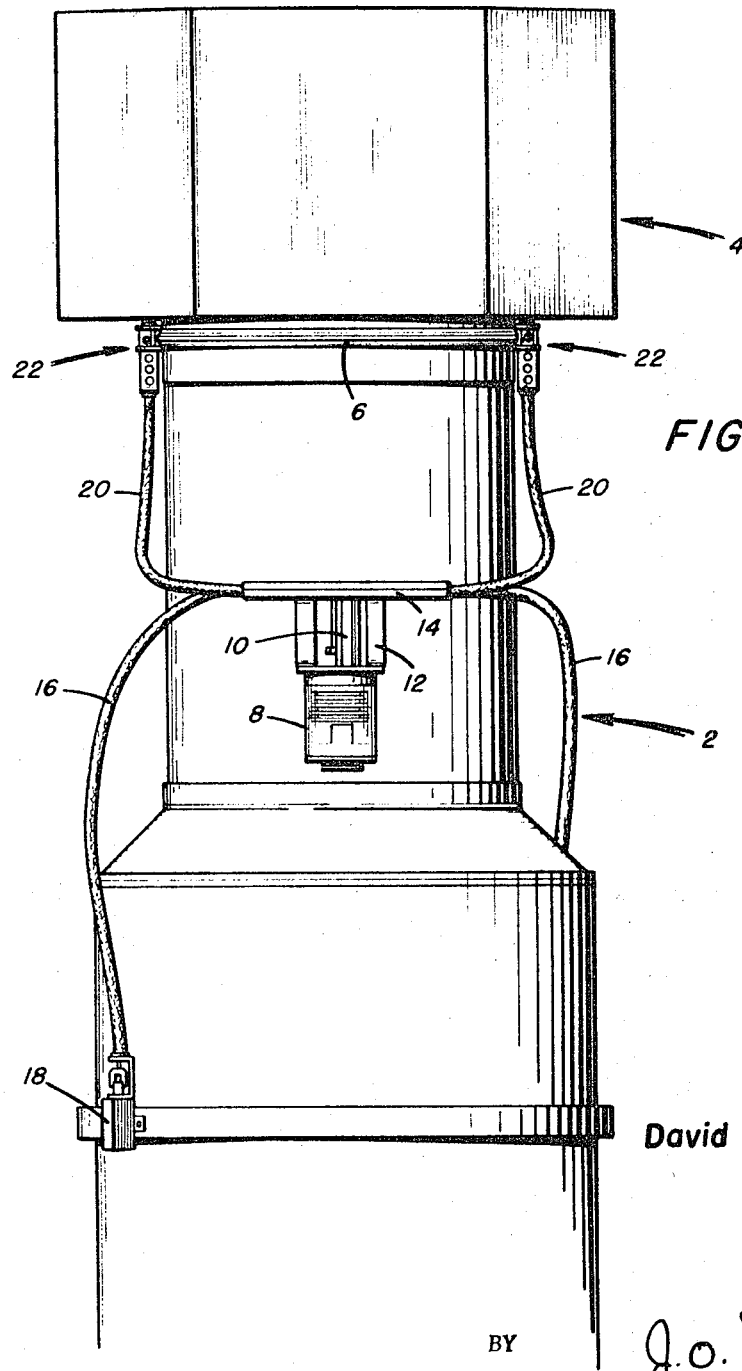
FIG. 1 is a front elevation illustrating an environment in which the present invention might preferably be used, and comprises a payload atop a launch vehicle and showing the present invention as a component of a separation system for releasing said payload.

Since the present invention was developed as a component of a passive separation system, a brief description of the function of the present invention within said system will be given. With reference to FIG. 1, a launching vehicle 2 having a payload 4, such as a satellite, releasably secured thereto by a well-known Marmon type collar 6, is shown. A passive separation system of which the present invention may serve as a component is also illustrated generally in FIG. 1 and comprises a timer 8 secured to a trigger assembly 10, which is in turn fastened to the upper end of the launch vehicle 2 by a mounting bracket 12. A horizontal tray 14 is carried by the mounting bracket 12, which tray receives cable release plungers connected to a first pair of cables 16, each of which is operatively attached to a despin weight release mechanism 18, of a type well-known in the art. The tray 14 also receives cable release plungers connected to a second pair of cables 20 each of which operatively engages a clamp 22 according to the present invention which releasably retains under considerable tension the ends of the Marmon collar 6.

Figure 2:
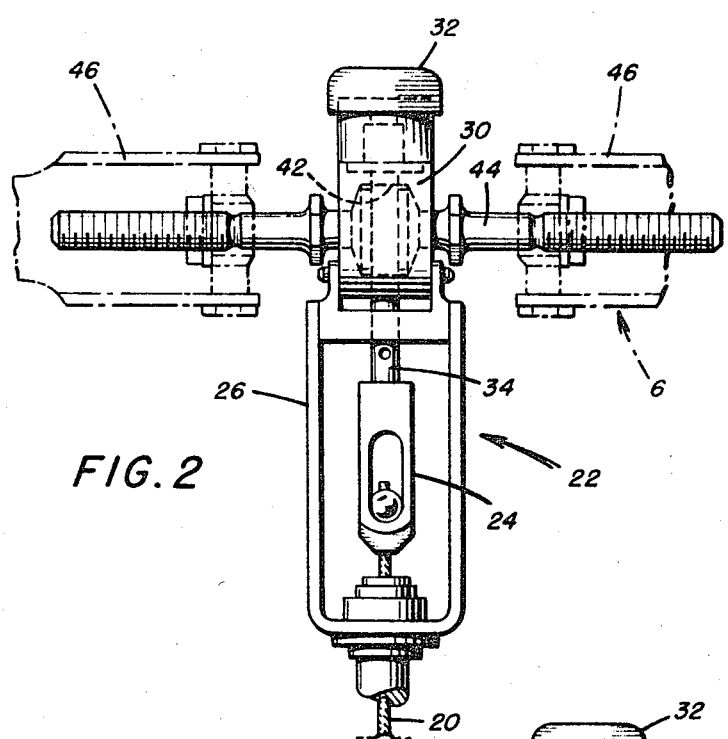
FIG. 2 is a front elevation of the releasable clamp according to the present invention.
Figure 3:
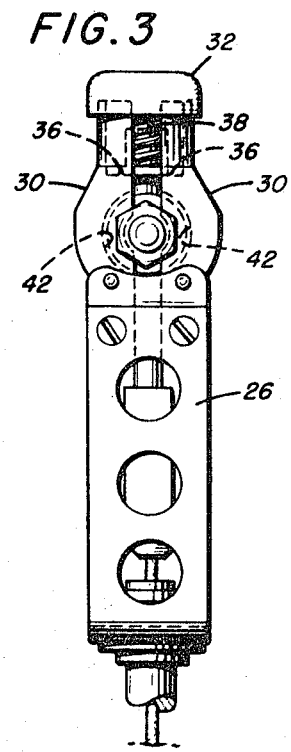
FIG. 3 is an end view of the clamp shown in FIG. 2.
Figure 4:
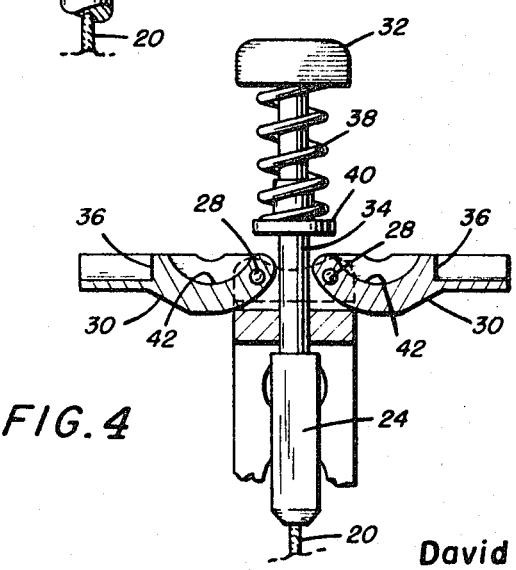
FIG. 4 is an end elevation partly in section of the clamp shown in a released position.

With particular reference to FIGS. 1 and 2, the cables 20 are each connected by a lanyard fastener 24 to a releasable clamp, shown generally at 22. The clamp comprises a mounting bracket 26 upon which are hingeably attached at 28 a pair of clamp arms 30, which are initially held in abutting relationship and maintained in position by a recessed cap 32 impressed over and encircling the upper terminal portions of said arms, the arms being shaped to receive said cap. A shaft 34 connects the cap to the lanyard fastener 24. As shown in FIGS. 3 and 4, the clamp arms 30 are provided with recesses 36 which initially receive a coil spring 38 that surrounds the shaft 34 and has attached thereto a flanged bushing 40, slidable on the shaft 34 and engageable with the bottom walls of the recesses 36. The coil spring 38 is thereby initially compressed between the cap 32 and the bottom wall of each recess 36, and provides the tension on the cable 20 that is necessary to slidably actuate the cable release plungers. As clearly shown in FIGS. 2, 3 and 4, the hinged clamp arms 30 are provided with additional recesses 42 for accommodating the terminal, pintle shaped ends of a pair of bolts 44 on the respective ends 46 of the Marmon collar 6, shown in phantom in FIG. 2. Thus, when the clamp arms 30 are folded beneath the cap 32, the bolts are retained, despite their being under considerable tension, in the recesses 42 of the clamp arms 30. Upon functioning of an external triggering mechanism (not shown) connected to the cables 20, the tension on the cable 20 will be relieved, allowing the coil spring 38 to expand and resiliently bias the cap 32 away from the clamp arms 30. The clamp arms 30 will unfold, thereby releasing the bolts 44. The Marmon collar 6 will then fall away from the launch vehicle 2, allowing the payload 4 to separate therefrom.

Obviously, many modifications and variations of the present invention are possible in the light of the above teachings. It is therefore to be understood that what is claimed is:

1. A releasable clamp comprising,
    a mounting bracket,
    a pair of clamp arms hingeably attached to said mounting bracket,
    a cap for releasably holding said clamp arms in an abutting relationship,
    resilient means for biasing said cap to a position releasing said clamp arms, and
    means for releasably retaining said cap on said clamp arms against the action of said resilient means.

2. The releasable clamp of claim 1, wherein
    the clamp arms are provided with recesses for accommodating said resilient means between said clamp arms, and
    wherein the clamp arms are provided with recesses to receive ends of bolts to be retained.

3. The releasable clamp of claim 2 and further comprising,
    a shaft having a flanged bushing which engages the walls of the recesses in said clamp arms,
    said shaft being associated with the cap,
    said resilient means being retained under compression by said bushing and by said cap, and
    a lanyard fastener for retaining said resilient means under compression.

4. In a system of the character described, including a collar having a pair of opposed bolts,
    a releasable clamp comprising,
    a mounting bracket, a pair of clamp arms hingeably attached to said mounting bracket,
    a cap for releasably retaining the clamp arms in abutting relationship,
    resilient means for urging said cap toward displacement from said clamp arms,
    said clamp arms having recesses for receiving said resilient means and recesses for receiving the ends of said bolts, and
    means for releasably retaining said cap on said clamp arms against the action of said resilient means.

5. The invention as recited in claim 4, wherein said resilient means comprises a spring, and
    wherein said last-mentioned means includes a shaft connected to the cap, a fastener connected to the shaft, and a cable secured to the fastener.

References Cited

UNITED STATES PATENTS

| | | |
|---|---|---|
| 138,799 | 5/1873 | Gleason. |
| 3,122,098 | 2/1964 | Glennan _____ 102—49.5 |

DONALD A. GRIFFIN, Primary Examiner

U.S. Cl. X.R.

102—49.5